United States Patent Office 3,342,195
Patented Sept. 19, 1967

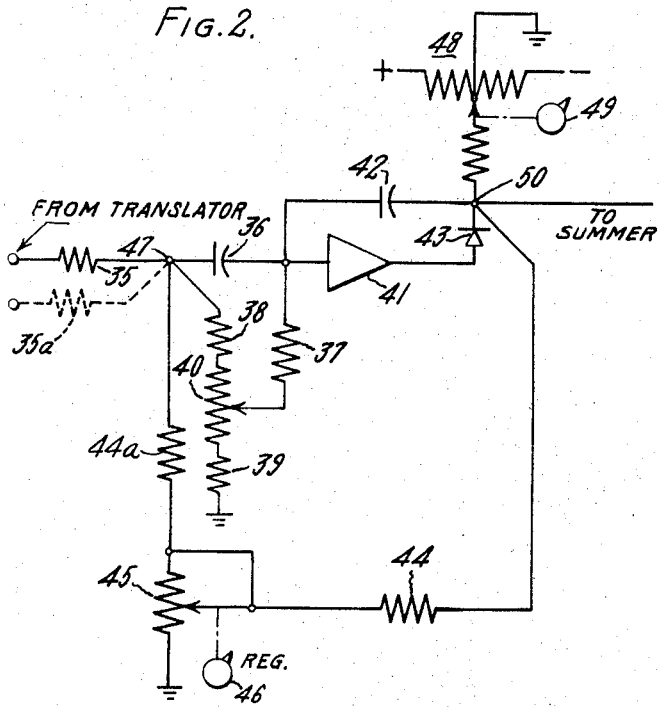
Fig.2.
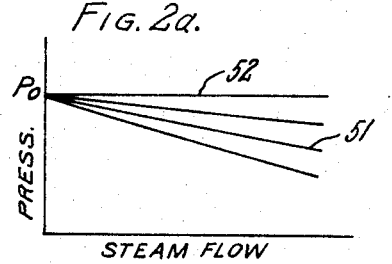
Fig.2a.
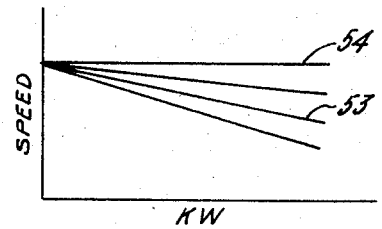
Fig.2b.
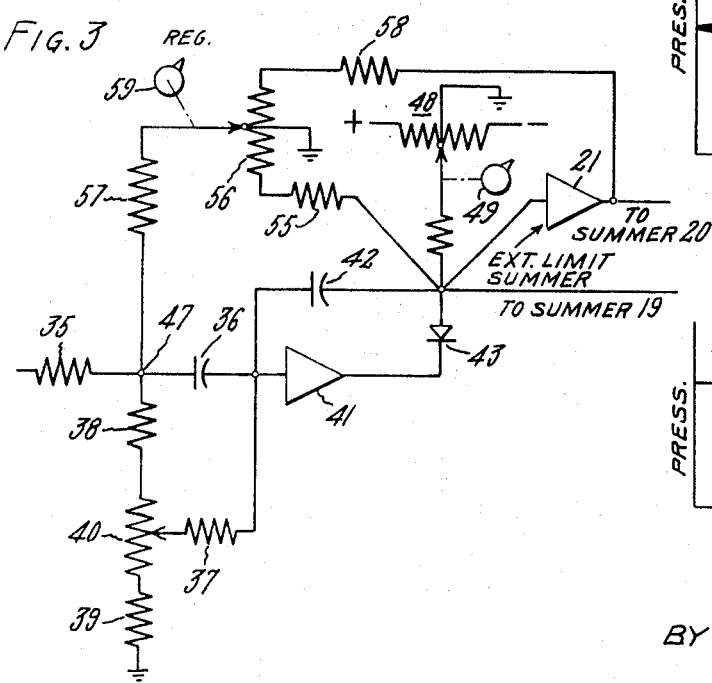
Fig.3.
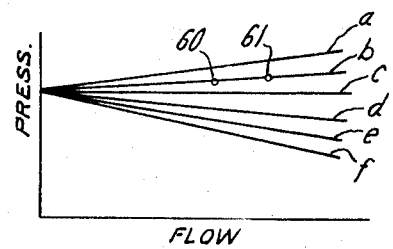
Fig.3.a.
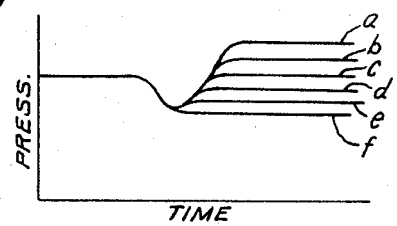
Fig.3b.
INVENTOR
JAMES B. WAGNER
BY W. C. Cutchen
HIS ATTORNEY

3,342,195
SPEED AND MOTIVE FLUID PRESSURE CONTROL SYSTEM FOR STEAM TURBINES
James B. Wagner, Lynnfield, Mass., assignor to General Electric Company, a corporation of New York
Filed Aug. 11, 1964, Ser. No. 388,887
7 Claims. (Cl. 137—29)

ABSTRACT OF THE DISCLOSURE

Automatic extraction turbine control system has pressure regulator for adjusting pressure/flow characteristic and speed regulator for adjusting speed/load characteristic. Both regulators have adjustable RC input circuit connected to the input of an integrating operational amplifier and have an adjustable feedback circuit connected to the input of the RC circuit.

---

Figure 1:
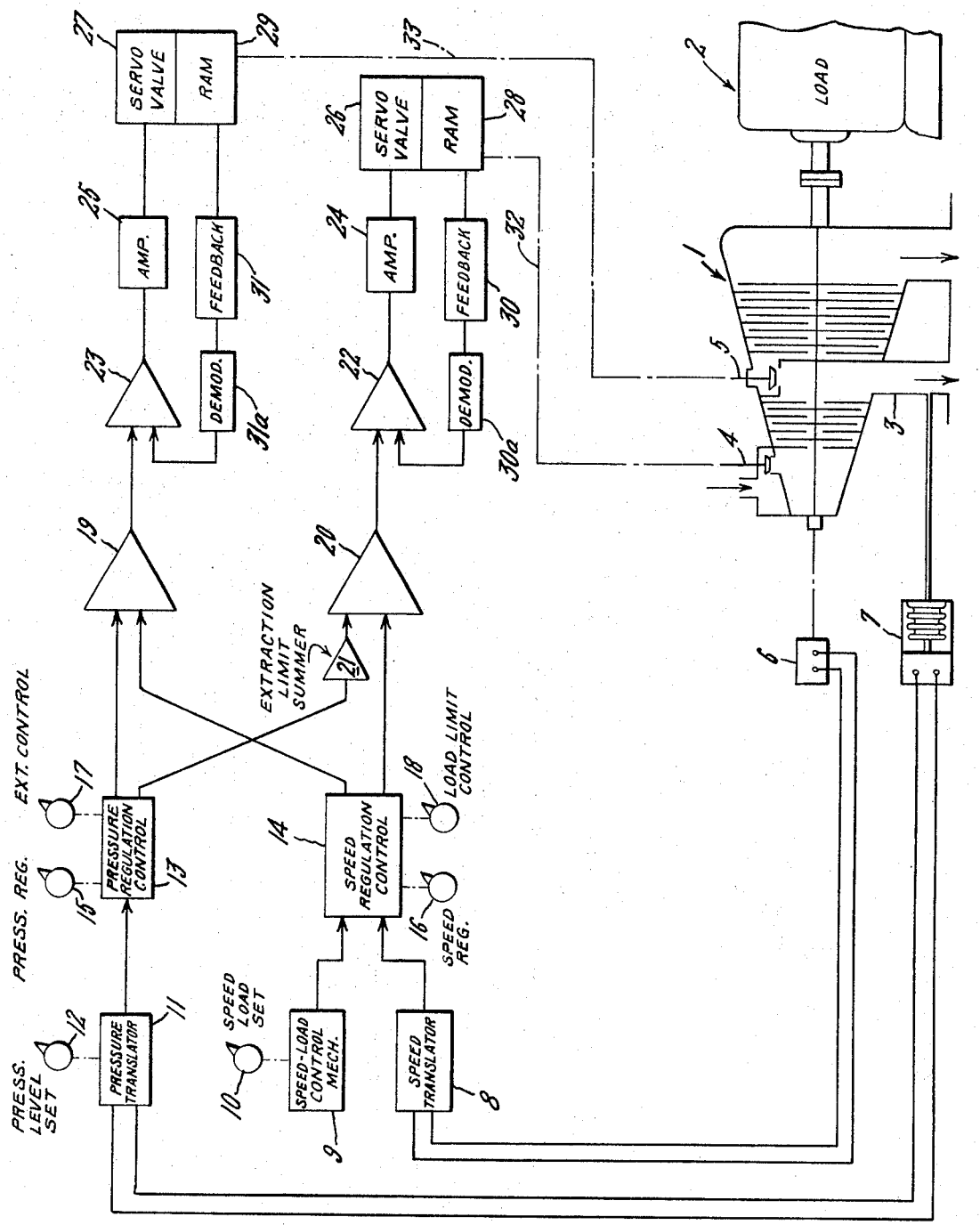

This invention relates to an improved electrical control system for regulating the speed and/or steam pressure in a turbine under conditions of changing demand on the machine, such as changing load or changing extraction flow requirements.

When steam is extracted from an intermediate stage of an extraction-type steam turbine during operation thereof, it is desirable to maintain load by moving the inlet valve and the interstage valves in such a manner that the speed of the turbine is maintained substantially constant, even though the requirement for extracted steam may vary considerably. Also, in such a turbine, it is desirable to obtain "pressure regulation" by controlling the same valves so as to maintain the pressure of the steam extracted from the turbine for some purpose such as process steam, heating, etc., at a substantially constant value despite changes in external requirements for extraction steam and irrespective of changes in load.

An analogy may be found between the normal "droop" in steady state speed as load is added and the normal "droop" in extraction pressure as demands for extraction steam increase. The characteristic curves relating these variables can be termed "speed/load" characteristics and "pressure/flow" characteristics respectively. Unless special corrective devices are incorporated in the systems controlling pressure or speed, this droop will occur and is normally required to insure operational stability. Suggestions have been made previously in speed control systems for achieving "isochronous" speed control by employing means to obtain the time integral of the deviation of actual turbine speed from a desired or reference turbine speed, and to control the turbine so as to make this integral substantially zero. It has also been known to employ so-called "proportional plus reset" systems wherein an integrated error signal is combined with the error signal itself to give a certain type of response.

The present invention is directed toward speed control plus simultaneous control of extraction pressure under varying flow demands in an extraction turbine. The concepts to be disclosed can also be used to obtain isochronous speed control, as well as any desired drooping speed/load characteristic. Although the drawings and description herein will be set forth in terms of a single extraction turbine having inlet and interstage valves to control both speed and extraction pressure, it will be understood that certain aspects of the invention are also applicable, in simpler form, to simple speed control of a turbine using the inlet valves alone.

Arrangements have been disclosed for electrically controlling mixed-pressure and extraction turbines through the use of speed and pressure sensing transducers which provide electrical feedback signals to be compared with reference electrical signals, the deviations then being amplified and used to control hydraulic servo valves to move the steam valves in a desired fashion. Exemplary of such systems, and incorporated herein by reference, are U.S. Patents 2,977,768; 3,064,435 and 3,091,933, each being issued in the joint names of James B. Wagner and Kenneth O. Straney and assigned to the assignee of the present application. The foregoing patents disclose means for controlling the speed droop and pressure droop by adjusting the gain of the electrical components in the closed speed and pressure loops. In some applications, one may desire to have "isochronous" control (exact correspondence of actual speed with reference speed despite variations in load) or "isobaric" control (exact correspondence of actual extraction pressure with desired extraction pressure despite variations in demand flow).

There are occasions where, under special circumstances, it is desired that the extraction pressure exhibit a rising rather than either an isobaric or drooping characteristic under changes in demand flow. Previously known pressure controlling systems for extraction turbines, whether of the electrohydraulic type or the mechanical type, have not provided for achieving this rising pressure/flow characteristic.

Accordingly, one object of the present invention is to provide an improved electrical device for regulating a closed loop system under variations in external demand affecting the system.

Another object of the invention is to provide an electrical regulating device giving proportional plus integral response to an input signal, wherein the steady state gain and time constant can be easily adjusted.

Another object of the invention is to provide an improved electrical circuit for speed or pressure regulation in an extraction turbine electrohydraulic control system.

Still another object of the invention is to provide an improved circuit for regulating the extraction pressure of a turbine having electrically controlled valves, so as to obtain a selectable drooping, isobaric, or rising pressure flow characteristic, as desired.

Yet another object of the invention is to provide an improved electrical circuit for obtaining isochronous or a selectable drooping speed/load characteristic in a turbine speed control system.

Further objects and advantages of the invention will become apparent from the description that follows, taken in connection with the accompanying drawings, in which:

FIG. 1 is a schematic block diagram of a single extraction turbine employing regulation control for both speed and extraction pressure, FIG. 2 is a circuit diagram of a regulation controller suitable for obtaining constant or a selectable drooping characteristic of either speed or extraction pressure, FIG. 2a is a graph illustrating typical extraction pressure/flow characteristics, FIG. 2b is a graph illustrating typical speed/load characteristics, FIG. 3 is a circuit diagram of a modified regulation controller suitable for obtaining either drooping, constant, or rising pressure/flow characteristics, FIG. 3a is a graph of typical pressure/flow characteristics obtainable with FIG. 3, FIG. 3b is a graph of pressure variations with time corresponding to FIG. 3a.

Briefly stated, the invention is practiced by interposing a regulation controller in a closed speed loop or closed pressure loop, the regulation controller having as an input thereto, a voltage representing the deviation or error in speed or pressure from a reference speed or pressure due to variations in load or flow respectively. The regulation controller comprises a circuit arranged to serve both a proportional and an integrating function in the control loop. adjustment of additional circuit means, providing either positive or negative feedback within the pressure controller, serves to provide a selected rising or drooping characteristic respectively.

Referring now to FIG. 1 of the drawing, a turbine 1 of the single extraction type is shown driving a load 2, such as a generator, and supplying extraction steam through an extraction conduit 3. The admission of steam to the turbine is controlled by the inlet valve 4, and the interstage valve 5. Turbine speed is sensed and converted to a proportional electrical quantity by a speed transducer 6, such as a permanent magnet A-C generator. Extraction pressure in conduit 3 is is sensed and converted to a proportional elecrical quantity by pressure transducer 7. The actual speed measured by transducer 6 is compared with a reference speed electrical signal, representing a desired "no load" speed in a speed translator 8. An additional reference signal is provided by the speed-load control mechanism 9, in accordance with the setting of speed-load set adjusting knob 10. The details of the speed translator 8 and speed load control mechanism 10 are immaterial to the present invention but can be had by referring to the aforesaid Wagner and Straney patents. The output of speed translator 8 is a D-C signal which varies about a D-C reference level in accordance with changes in turbine shaft speed. The reference level is changed by setting the speed-load set knob 10.

Similarly, a pressure translator 11 has, as its output, a D-C voltage which varies around a D-C reference level as the pressure sensed by transducer 7 varies with respect to a desired or reference pressure set by pressure level set knob 12. Again, the details of pressure translator 11 may be had by reference to the aforementioned Wagner and Straney patents.

The pressure regulation control 13 and the speed regulation control 14 serve to control the pressure/flow and the speed/load characteristic and will be explained later in detail. The external adjustments to pressure regulation controller 13 are a pressure regulating knob 15 and an extraction limit control knob 17. The external adjustments to the speed regulation controller 14 are analogous and constitute a speed regulating knob 16 and a load limit control knob 18.

The D-C output signal from speed regulation controller 14 is applied both to a summing amplifier 19 and to a summing amplifier 20. The D-C output signal from the pressure regulation controller 13 is applied also to summing amplifier 19 and summing amplifier 20, the last mentioned signal being inverted in polarity in an additional amplifier 21, labeled extraction limit summer. Amplifiers 19, 20, 21 are high gain D-C operational amplifiers of the type mentioned in the aforesaid Wagner and Straney patents, 19 and 20 each being connected to sum the two D-C input voltages applied. Amplifier 21 is connected so as to invert the polarity of the signal passing through it and also includes means, not material to the present invention, to limit its output when the design limits of the turbine prevent it from reaching both of two desired criteria.

The output from summing amplifier 19 is a D-C command signal representing a certain position for interstage valve 5. Valve 5 is positioned in accordance with the magnitude of the signal by means of a closed servo loop consisting of summing amplifier 23, power amplifier 25, hydraulic servo valve 27, hydraulic ram 29, valve position feedback transducer 31, and demodulator 31a, the mechanical connection from ram 29 to valve 5 being indicated by dotted line 33.

Similarly, the output from summer 20 is a D-C signal which is the command signal controlling the position of inlet valve 4 in accordance with the magnitude of the signal. The closed loop with valve position feedback is similar to that for interstage valve 5 and comprises summing amplifier 22, power amplifier 24, servo valve 26, hydraulic ram 28, feedback transducer 30, and demodulator 30a, mechanical linkage from the ram to the valve being designated by dotted line 32.

Briefly, the system works in the following way. Error signals from the speed loop portion are applied to summers 19, 20, and cause inlet and interstage valves 4, 5, to operate in the same opening and closing sense to reduce the speed error without affecting the extraction pressure. Error signals from the pressure loop portion are also applied to summers 19, 20. However, since one of these is inverted in polarity by extraction limit summer 21, the valves 4, 5 operate in opposite sense to one another in a manner to reduce the pressure error without affecting the unit load. It will be understood that various other limits and safeguards in the way of signal limiters and various other adjustments are provided which are not shown in order to avoid obscuring the invention, but which may be found by referring to the aforementioned Wagner and Straney patents.

Reference to FIG. 2 of the drawing illustrates a simple basic form of the regulation controller which can be used either for the pressure regulation control 13 or speed regulation control 14 of FIG. 1. It should be noted that, according to whether the regulation controller shown in FIG. 2 is being used as a pressure regulator or a speed regulator in the integrated system of FIG. 1, its input and output polarities and polarity of the limiting diode would be different. Such changes will be obvious to one skilled in the art and the regulation controller will be discussed without regard to the actual polarity which would be used in the FIG. 1 system, in order to provide a general description.

The regulation controller of FIG. 2 comprises an input resistor 35, an RC differentiating circuit comprising input capacitor 36, resistances 37, 38, 39, and variable resistance 40. Where the controller is being used as an isochronous speed controller, an additional input resistor 35a would be used as shown in dotted lines, this being supplied from a D-C reference source. The RC network serves as the input to a high gain D-C operational amplifier 41 with feedback capacitor 42, and a limiting diode 43. The foregoing mentioned elements are sufficient to provide isochronous or isobaric control, if desired.

In order to provide a drooping characteristic which may be adjusted, means are provided for feeding back a selectable portion of the output of the controller. To do this, feedback resistors 44, 44a and potentiometer 45 are employed, the latter being adjusted with knob 46. Resistors 44 and potentiometer 45 form a grounded voltage divider. The tap on poentiometer 45 supplies a voltage to resistor 44a which is proportional to the output of the controller.

A circuit for limiting the output of the regulation controller is provided by means of a D-C biasing circuit 48 which, when adjusted by knob 49, places a limiting voltage at node 50. This limiting voltage, in conjunction with the limiting diode 43, provides a "hard limit" on the output of the summer 41.

Reference to FIGS. 2a and 2b illustrates typical obtainable droop characteristics. FIG. 2a represents pressure/flow characteristics which can be obtained when a regulation controller such as the one shown in FIG. 2 is used as the pressure controller 13 of FIG. 1. In this case, regulation knob 46 would correspond to pressure regulation knob 15 and the limit knob 49 would correspond to extraction limit knob 17.

FIG. 2b represents speed/load characteristics which can be obtained when a regulation controller such as the one shown in FIG. 2 is used in place of the speed regulation control 14 of FIG. 1. Here knob 46 would correspond to speed regulation knob 16 and knob 49 would correspond to load limit control knob 18.

Manipulation of knob 46 (knob 15) will provide a desired pressure/flow characteristic such as 51 in FIG. 2a. By rotating knob 46 so as to ground (or completely remove) the feedback signal, the regulation controller will provide isobaric control or exact correspondence of extraction pressure with desired extraction pressure under a wide range of flows as indicated by line 52 on the graph.

Similarly, when the regulation controller is used in the speed loop (see speed regulation control 14 in FIG. 1), adjustment of knob 46 (knob 16) will provide a selectable drooping characteristic such as 53 in FIG. 2b. If knob 46 is rotated to ground the feedback signal, the turbine will operate isochronously, as indicated by line 54 in FIG. 2b.

A modification of the regulation controller is shown in FIG. 3, which is particularly useful as a pressure regulation controller, since it will provide a drooping, isobaric, or rising characteristic. The elements of FIG. 3 which are identical to those of FIG. 2 have the same reference numerals, viz, the elements of the input impedance, the RC differentiating input circuit, the D-C amplifier and limit biasing circuit 48. However, the feedback circuit to input node 47 is arranged slightly differently in order to provide either positive, negative, or no feedback. A degenerative (negative) feedback is obtained by a circuit including resistor 55, the lower portion of the variable resistance 56 (having a grounded tap in the center thereof), and resistor 57. A regenerative (positive) feedback circuit includes a resistor 58, the upper portion of the variable resistance 56, and resistor 57. In order to provide the sign inversion required for positive feedback, the resistance 58 is connected to the output of the extraction limit summer 21, which is an operational amplifier causing polarity reversal (see also FIG. 1).

It will be observed that by adjusting the regulation control knob 59 so as to adjust the movable tap of resistor 56, any desired feedback portion of the output voltage of the regulation corrector (or a polarity inversion thereof), can be selected and supplied to node 47. Likewise, the feedback can be removed entirely by turning knob 59 so that the movable tap is located at the grounded portion of resistor 56.

Referring to FIG. 3a of the drawing, curves a–f show pressure/flow characteristics obtainable with the circuit of FIG. 3. When the regulation knob is placed so as to ground the feedback signal, characteristic c will be obtained and the extraction pressure will remain constant despite variations in flow demand. When knob 59 is adjusted so that the movable tap is on the lower portion of resistance 56, negative feedback applied to node 47 results in a selectable drooping characteristic as indicated by d, e, f. If a rising pressure characteristic is desired, the upper portion of resistance 56 is employed, wherein positive feedback is applied to node 47, resulting in characteristics a, b. Operational stability is obtained via the time constant determined by the setting of potentiometer 40.

Reference to FIG. 3b illustrates the time variations in extraction pressure obtainable with each of the pressure/flow characteristics of FIG. 3a, assuming an incremental jump in demand for extraction steam. In other words, if a rising characteristic in FIG. 3a such as b is set with knob 59, a step increase in demand for extraction steam from a flow represented by point 60 to a flow represented by 61 will result in an immediate drop in pressure, followed by an increase in pressure to a higher steady state pressure. The time variation in pressure is represented by curve b in FIG. 3b. Adjustment of the time constant may be made with potentiometer 40 as explained previously.

The operation of the device will be apparent from the following explanation. It can be shown that the time integral of a time differentiated varying signal will be proportional to the original signal. In FIG. 2 proportional and integrating branches are provided by the RC input circuit acting in combination with the integrating amplifier. The integrating branch of the regulation controller is provided by a resistive input impedance (consisting of the series parallel combination of resistor 35, resistor 38, a portion of resistor 40, and resistor 37) acting together with the integrator (consisting of high gain D-C amplifier 41 and feedback capacitor 42).

The proportional branch, on the other hand, is provided by means of an RC differentiating circuit (consisting of capacitor 36 and resistors 37, a portion of 40, and 39) acting as a capacitive input impedance for the integrating circuit consisting of amplifier 41 and feedback capacitor 42. The constant of proportionality (or instantaneous gain) achieved by the series combination of differentiator and integrator under transient conditions will be found to depend, in part, on the ratio of capacitances 42, 36. The time constant of the integrating branch will depend primarily on the setting of potentiometer 40.

The action of the feedback path established through resistors 44, 44a, 45 of FIG. 2 is to attenuate and modify the input signal. The feedback attenuation factor is controlled by knob 46, and if the slide arm on potentiometer 45 is grounded, the feedback attenuation factor is no longer present.

During steady state, the gain of the regulation controller is a complicated function of the values of the various resistors. During transient conditions, the instantaneous or proportional gain factor is further modified by the ratio of the capacitances 42, 46 as explained previously. The integrating or "reset" time constant during transient conditions is determined by potentiometer 40.

The FIG. 3 arrangement functions like the FIG. 2 arrangement, except that additional provision is made to apply positive rather than negative feedback, if desired, so as to obtain a rising characteristic as shown in FIG. 3a. Operational stability is provided by adjustment of the time constant (using potentiometer 40) and is also affected by the interrelationship of the overall speed and pressure loops shown in FIG. 1.

As mentioned previously, the invention is not limited in any way to the single extraction turbine shown for the purpose of illustrating the invention, but the system shown can easily be extended to systems using double or triple extraction, as well as non-extraction turbines if only the speed regulation controller is desired. It will also be found that the principles involved can be applied to other types of control systems involving measured variables other than pressure and speed. The principles are applicable generally to closed loop control systems where there are extraneous inputs affecting the controlled variable.

While there has been described herein what is considered to be the preferred embodiment of the invention, other variations and modifications will occur to those skilled in the art. Therefore, it is intended to cover in the appended claims all such modifications as fall within the true spirit and scope of the invention.

What I claim as new and desire to secure by Letters Patent of the United States is:

1. In combination:
   a turbine having at least one valve with its position controlled by an electrical signal,
   means responsive to an operating condition of the turbine furnishing an electrical error signal representing a deviation from a desired selectable operating condition due to a change in external demand on the turbine,
   means summing portions of said error signal and the time integral of said error signal comprising a parallel-connected resistance and capacitance connected to the input of an integrating operational amplifier and supplying a resultant signal to the valve controlling means, and
   means for supplying a selectable portion of said resultant signal to the input of the summing means so as to adjust the change in a turbine steady state operating condition corresponding to a change in steady state external demand on the turbine.

2. In a turbine of the type having valves controlled by electrical signals correcting deviations from a reference operating condition of the turbine due to changes in external demand on the turbine,
   means providing modified regulation of the electrical signals controlling said turbine comprising a high gain D-C amplifier, a parallel-connected first capacitance and first resistance having an output end connected to the input of said amplifier, said first resistance being adjustable to vary the time constant, a second feedback capacitor connected between the input and output of said amplifier, a voltage divider connected from the output of said amplifier to ground potential to provide a source of feedback voltage, and a sec- resistance connecting the voltage divider with the input end of said parallel-connected first resistance and first capacitance, said last mentioned connection being adjustable to provide variable attenuation of the feedback voltage including removal thereof by connection to ground.

3. In combination:

a turbine having at least one valve with its position controlled by a D-C electrical signal, means responsive to an operating condition of the turbine furnishing a D-C electrical error signal representing a deviation from a desired selectable operating condition due to a change in external demand on the turbine, first means providing proportional plus intergral summation of said error signal, said first means comprising a high gain D-C amplifier, at least one parallel-connected capacitance and resistance connected to the input of said amplifier, and a feedback capacitor connected between the input and output of said amplifier, and second means providing a feedback circuit between the output of the amplifier and the input of the parallel-connected resistance and capacitance including means for adjusting the impedance of said feedback circuit so as to adjust the change in steady state operating condition corresponding to a given change in external demand on the turbine.

4. In an extraction turbine control system having inlet and interstage valves controlled by D-C electrical signals in response to changes in extraction pressure under variations of extraction flow, the combination of:

a pressure regulation controller connected to modify said electrical signals and having applied to its input a D-C electrical pressure error signal representing a deviation from a desired extraction pressure, said regulation controller comprising means summing portions of said pressure error signal and the time integral of said pressure error signal and supplying a resultant D-C signal to each of the inlet and interstage valve controlling means, variable impedance means connected for feeding back a selectable portion of said resultant signal to the input of said pressure controller, and means for causing polarity inversion or removal of said resultant signal feedback portion, whereby either a drooping, constant, or rising characteristic of extraction pressure versus extraction flow may be obtained.

5. In an extraction turbine control system having inlet and interstage valves controlled by D-C electrical signals in response to changes in speed under variations of load, the combination of:

a speed regulation controller connected to further modify said electrical signals and having as its input a D-C electrical speed error signal representing a deviation from a reference turbine speed, said speed regulation controller comprising circuit means including a parallel-connected adjustable resistance and capacitance having an output end connected to the input of an integrating operational amplifier, and means for feeding back a selectable portion of the output voltage of said amplifier to the input of said parallel-connected resistance and capacitance, said feedback means including an adjustable resistance for setting the speed droop characteristic of the extraction turbine.

6. In an extraction turbine control system of the type having inlet and interstage valves positioned by D-C electrical signals in repsonse to extraction pressure change caused by variations in extraction flow, the combination of:

a pressure regulation controller connected to modify said electrical signals and having as its input a D-C electrical pressure error signal representing a deviation from a desired reference extraction pressure, said pressure regulation controller comprising circuit means including a parallel-connected adjustable resistance and capacitance having an output end connected to the input of an integrating operational amplifier, and feedback means for feeding back a selectable portion of output voltage of said amplifier to the input to said parallel-connected resistance and capacitance including means for selectively reversing the polarity of said output voltage or removing it completely, whereby either a drooping, constant, or rising pressure versus extraction flow characteristic may be obtained by adjusting said feedback means.

7. In an extraction turbine control system of the type having inlet and interstage valves positioned by D-C electrical signals which have been cross-modified in response to turbine speed change and extraction pressure change caused by variations in load and extraction flow respectively, the combination of:

a pressure regulation controller and a speed regulation controller having as inputs thereto first and second D-C electrical error signals representing deviations from reference speed and reference extraction pressure respectively, each of said regulation controllers comprising means summing portions of said error signals and the time integrals of said error signals to supply respective first and second resultant D-C signals to both of the inlet and interstage valve controlling means, each of said regulation controllers further including feedback circuit means for supplying a selectable portion of the respective resultant signals of each of said regulation controllers to the input thereof, said feedback circuit means each including adjustable-impedances for varying the characteristics of changes in speed and extraction pressure respectively with changes in load and extraction flow respectively.

References Cited

UNITED STATES PATENTS

| | | | |
|---|---|---|---|
| 2,805,542 | 9/1957 | Boykin | 317—5 X |
| 2,827,910 | 3/1958 | Wells | 317—5 X |
| 2,829,662 | 4/1958 | Corey | 137—36 |
| 3,084,307 | 4/1963 | Landis | 317—5 |
| 3,091,933 | 6/1963 | Wagner | 60—67 |
| 3,139,922 | 7/1964 | Peczkowski | 137—34 X |
| 3,184,641 | 5/1965 | Wojcik | 317—5 |
| 3,187,223 | 6/1965 | Raeber | 317—5 |
| 3,274,443 | 9/1966 | Eggenberger | 137—30 X |

CLARENCE R. GORDON, *Primary Examiner,*